(12) United States Patent
Rossettini et al.

(10) Patent No.: US 11,066,194 B2
(45) Date of Patent: Jul. 20, 2021

(54) METHOD FOR THE SAFE RELEASE OF ARTIFICIAL SATELLITES IN EARTH'S ORBIT

(71) Applicant: D-ORBIT S.P.A., Fino Mornasco (IT)

(72) Inventors: Luca Rossettini, Fino Mornasco (IT); Lorenzo Ferrario, Fino Mornasco (IT); Lorenzo Arena, Fino Mornasco (IT)

(73) Assignee: D-ORBIT S.P.A., Fino Mornasco (IT)

( * ) Notice: Subject to any disclaimer, the term of this patent is extended or adjusted under 35 U.S.C. 154(b) by 0 days.

(21) Appl. No.: 16/768,423

(22) PCT Filed: Nov. 29, 2018

(86) PCT No.: PCT/IB2018/059456
§ 371 (c)(1),
(2) Date: May 29, 2020

(87) PCT Pub. No.: WO2019/106595
PCT Pub. Date: Jun. 6, 2019

(65) Prior Publication Data
US 2020/0361639 A1    Nov. 19, 2020

(30) Foreign Application Priority Data
Dec. 1, 2017    (IT) .................. 102017000138590

(51) Int. Cl.
*B64G 1/10*    (2006.01)
*B64G 1/64*    (2006.01)
(Continued)

(52) U.S. Cl.
CPC ............... *B64G 1/641* (2013.01); *B64G 1/10* (2013.01); *B64G 1/24* (2013.01); *B64G 1/443* (2013.01);
(Continued)

(58) Field of Classification Search
CPC ........ B64G 2001/643; B64G 2001/247; B64G 1/52; B64G 1/443; B64G 1/24; B64G 1/10; B64G 1/641
See application file for complete search history.

(56) References Cited

U.S. PATENT DOCUMENTS 5,199,672 A * 4/1993 King ............... B64G 1/007
244/164
5,203,844 A * 4/1993 Leonard ............ B64G 1/002
244/171.3
(Continued)

FOREIGN PATENT DOCUMENTS

| CN | 103612774 A | 3/2014 |
|---|---|---|
| CN | 103738509 A | 4/2014 |

(Continued)

OTHER PUBLICATIONS

China Office Action dated Dec. 29, 2020, issued in corresponding Chinese application.

*Primary Examiner* — Philip J Bonzell
*Assistant Examiner* — Tye William Abell
(74) *Attorney, Agent, or Firm* — Husch Blackwell LLP

(57) ABSTRACT

A method for the safe release of artificial satellite in Earth orbit includes the steps of providing an orbital transport spacecraft able to move at orbital height and comprising a plurality of PODs for releasing satellites transported by the orbital transport spacecraft, housing said orbital transport spacecraft in a space launcher configured to reach an orbital height; generating a release signal and transmitting it to the orbital transport spacecraft to release the orbital transport spacecraft from the space launcher, in case of failure to release the orbital transport spacecraft or in case of breakdown of the orbital transport spacecraft after releasing from the space launcher, activating a safety subsystem of the
(Continued)

orbital transport spacecraft to generate a POD activation sequence to release the satellites.

11 Claims, 4 Drawing Sheets

(51) Int. Cl.
   *B64G 1/24* (2006.01)
   *B64G 1/44* (2006.01)
   *B64G 1/52* (2006.01)

(52) U.S. Cl.
   CPC .......... *B64G 1/52* (2013.01); *B64G 2001/247* (2013.01); *B64G 2001/643* (2013.01)

(56) References Cited

U.S. PATENT DOCUMENTS

| | | | | |
|---|---|---|---|---|
| 5,605,308 | A * | 2/1997 | Quan | B64G 1/641 |
| | | | | 102/489 |
| 6,276,639 | B1 * | 8/2001 | Hornung | B64G 1/002 |
| | | | | 102/489 |
| 9,463,882 | B1 * | 10/2016 | Field | B64G 1/645 |
| 2011/0240802 | A1 * | 10/2011 | Balinov | B64G 1/641 |
| | | | | 244/173.3 |
| 2017/0327253 | A1 * | 11/2017 | Bogdanov | B64G 1/641 |

FOREIGN PATENT DOCUMENTS

| | | |
|---|---|---|
| CN | 105416610 A | 3/2016 |
| CN | 106542127 A | 3/2017 |
| DE | 202014008902 U1 | 2/2015 |

* cited by examiner

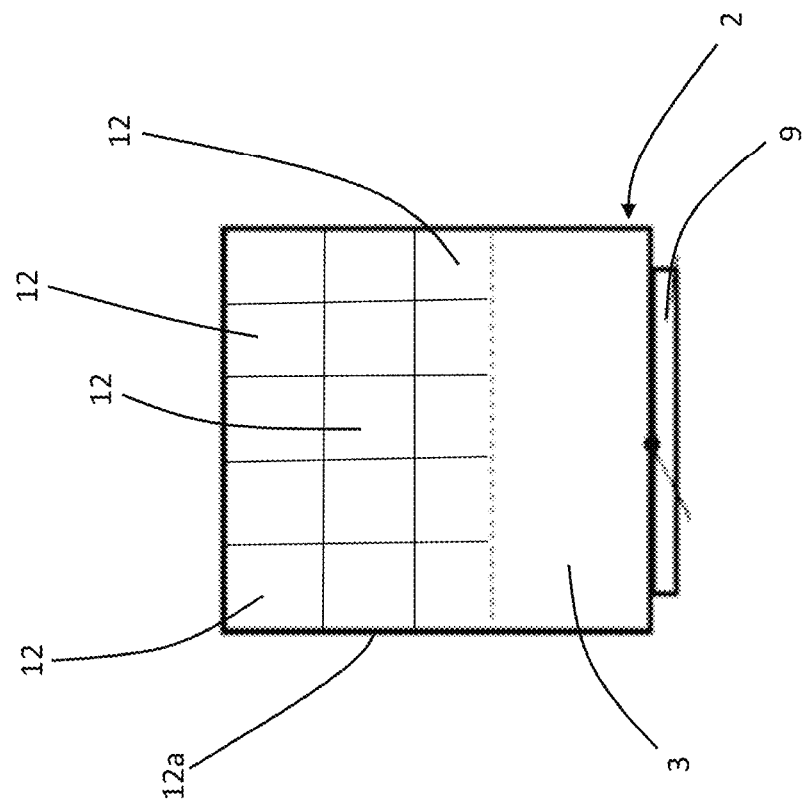
_Fig 2_
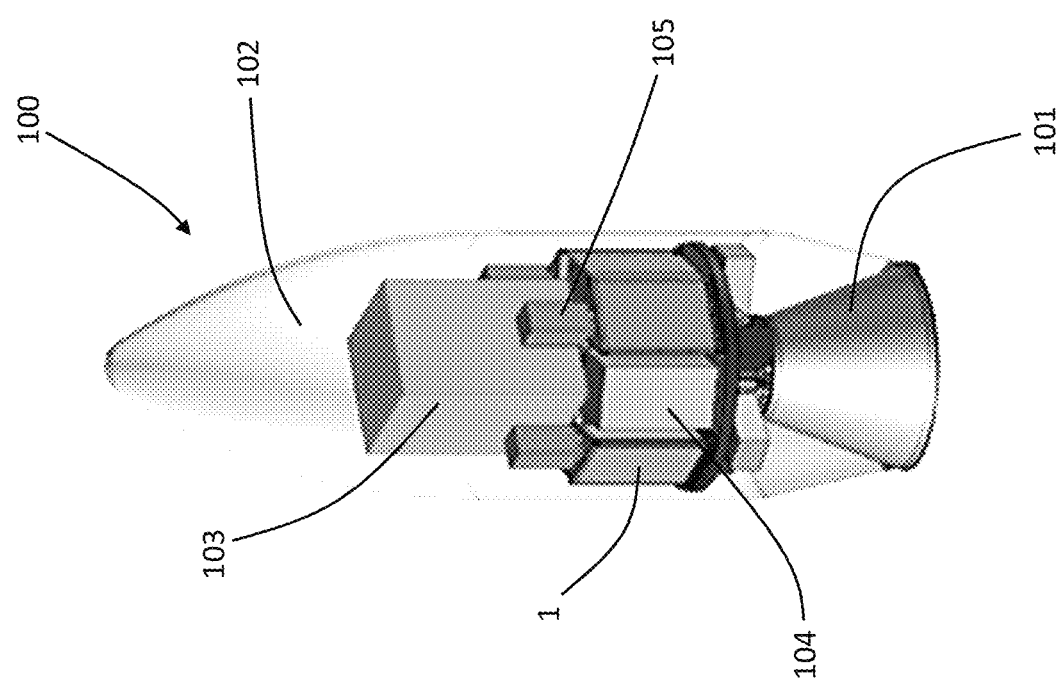
_Fig 1_

METHOD FOR THE SAFE RELEASE OF ARTIFICIAL SATELLITES IN EARTH'S ORBIT

CROSS REFERENCE TO RELATED APPLICATIONS

This application is a U.S. National Phase Application of International Application No. PCT/IB2018/059456 filed on Nov. 29, 2018, which claims priority to Italian Application No. 102017000138590 filed on Dec. 1, 2017. The disclosures of International Application No. PCT/IB2018/059456 and Italian Application No. 102017000138590 are incorporated herein by reference.

TECHNICAL FIELD

The present disclosure relates to a method for the safe release of artificial satellites into Earth orbit, preferably of small satellites or nanosatellites

BACKGROUND

In the last decade, technological evolution has led to rapid technological obsolescence of consumer devices and to technology turnover times of the order of a few years. In this regard, the mobile telephony sector can be considered as an example.

In the sector of artificial space satellites, technological development on the contrary tends to advance at a far slower pace, counting on the capability of artificial satellites to last a long time, over 15 years in some cases. The costs to access this space sector can therefore be sustained only by government agencies and by a few large companies, the only ones able to incur the enormous costs of developing artificial satellites and placing them in order.

However, the scientific research needs of research centres and universities have led to new attempts to use space by means of extremely small satellites, that can be built at relatively low cost using the miniaturised electronic technology available on the free market.

In this regard, starting from 1999 the Cal Poly and Stanford universities started to develop and propose as a standard a new satellite, called "Cubesat" because of its particular cubic shape, sized 10×10×10 cm. This type of satellite (that matches the conventional definition of small satellite and more specifically nanosatellite) is a modular satellite and allows to accommodate all the typical subsystems of a larger satellite, relinquishing, however, the performance of the larger and more expensive satellites.

Small satellites and nanosatellites, and in particular their standardised version in CubeSat format, have become very popular and initially used mainly by universities to allow students and researchers to send components and research projects into space.

However, satellites of this type were quickly valued for commercial purposes, and an ever growing number of private companies intuited the value of being able to launch constellations of CubeSats to render services on Earth, mitigating the intrinsic lower performance levels of these satellites with their high number in orbit (up to several hundreds of samples) and with their flight information or constellation.

While in the last 60 years approximately 6,000 artificial satellites have been launched, today hundreds of new private companies, supported by private capital, are building and expect to launch more than 23,000 artificial satellites in the next 5-10 years.

CubeSats are transported into space like any other satellite of a higher class with a space launcher. However, their small size makes their dedicated launch uneconomical; for this reason, they have always been placed in orbit as secondary payloads of other, larger satellites. A launcher is typically sold for 60 to 100 million Dollars, so it is difficult for a small satellite, often costing less than a million Euro, to have access to a dedicated launch capacity.

Cubesats are generally released practically in unison just after the release of the main satellite, constituting a sort of cloud that is slowly dispersed in space.

In particular, Cubesats are housed in PODs (Picosatellite Orbital Deployer) which are interfaced directly with the launcher to release the Cubesats once the launcher has reached the set orbit. By means of a simple timer, activated by the launcher, the PODs open a release door to release the Cubesats housed inside them.

Since, as stated, the launcher is arranged to launch the main satellite and the POD for the Cubesats constitute a secondary load, very often the mission specifications of the launcher do not provide for a safe and guaranteed release of the Cubesats but more simply they provide only for the systems of the launcher to send a release signal to the various PODs. Therefore, the task of the PODs is to assure an effective release of the Cubesats.

In case of failure of the PODs, the Cubesats are therefore not released, with evident problems for customers.

In this context, the present invention proposes making available a method for the safe release of artificial satellites into Earth orbit that is free of the aforementioned critical issues.

SUMMARY

In particular, the present invention relates to a method for the safe release of artificial satellites in Earth orbit comprising:
providing an orbital transport spacecraft able to move at orbital height and comprising a plurality of PODs for releasing satellites transported by the orbital transport spacecraft;
housing said orbital transport spacecraft in a space launcher configured to reach an orbital height;
generating a release signal and transmitting it to the orbital transport spacecraft to release the orbital transport spacecraft from the space launcher;
in case of failure to release the orbital transport spacecraft or in case of breakdown of the orbital transport spacecraft after releasing from the space launcher, activating a safety subsystem of the orbital transport spacecraft to generate a POD activation sequence to release the satellites.

Preferably, activating a safety subsystem comprises determining a first time representative of the time elapsed since the last communication occurred between the orbital transport spacecraft and a remote transmission station, comparing said first time with a reference time indicative of a maximum waiting time, activating actuator members for the release of a satellite when the first time is greater than the reference time.

Preferably activating actuator members comprises opening a release door of a POD, locking the release door in open position, exerting a separation thrust on the satellite to be released.

Preferably, activating actuator members is followed by waiting a waiting time and activating actuator members of an additional POD to release a further satellite.

Preferably, said safety subsystem of said orbital transport spacecraft comprises a command and control unit on board said orbital transport spacecraft or on board each POD powered by an electric power source on board said orbital transport spacecraft.

Preferably, said activation sequence is implemented by said command and control unit.

Preferably, said command and control unit is completely autonomous and independent from further subsystems of the orbital transport spacecraft.

Preferably, said satellites are released according to a predetermined release pattern.

Preferably, the separation thrust exerted on each satellite is calculated as a function of the orbit to be reached by the satellite.

Preferably, said electric power source is a battery dedicated to the command and control unit or is a battery shared with subsystems of a satellite platform of the orbital transport spacecraft or are photovoltaic panels.

DETAILED DESCRIPTION OF THE DRAWINGS

Further characteristics and advantages of the present invention will become clearer from the following detailed description of some preferred embodiments thereof, with reference to the appended drawings and provided by way of indicative and non-limiting example. In such drawings:

FIG. 1 schematically shows a space launcher;

FIG. 2 schematically shows an orbital transport spacecraft;

FIG. 3 schematically shows a first component of the orbital transport spacecraft of FIG. 2;

FIG. 4 shows a detail of the component of FIG. 3;

FIG. 5 schematically shows a second component of the orbital transport spacecraft of FIG. 2;

FIG. 6 schematically shows to arrangement of satellites inside the component of FIG. 3; and FIG. 7 is a block diagram according to the method of the present invention.

DETAILED DESCRIPTION

In FIG. 1, the number 100 indicates a space launcher able to reach an orbital height around the Earth. The space launcher 100 can be a space launcher of the type with vertical take-off which from the Earth's surface is able to reach an orbit around the Earth or a vehicle that, released from an aircraft, is able to reach an orbit around the Earth.

Preferably, the orbital height reached is a low Earth orbit (LEO), i.e. a circular orbit around the Earth at a height between the Earth's atmosphere and the Van Allen belt, between 200 km and 2000 km from the surface of the Earth.

The space launcher 100 comprises a propulsion system 101 (for example a chemical propellant), control and guidance systems (not shown) and a housing compartment 102 for a payload.

Said payload can for example comprise a main satellite 103 and a plurality of secondary satellites 104.

At least one orbital transport spacecraft 1 finds storage space and is housed inside the housing compartment 102.

The orbital transport spacecraft 1 is connected to the space launcher 100 through a conventional orbital separation system 105 configured to release with a predetermined thrust the orbital transport spacecraft 1 once the space launcher 100 reaches a predetermined orbital height.

Preferably, said orbital height is the one adapted for the release of the main satellite 103, i.e. of the main payload of the space launcher 100.

The orbital transport spacecraft 1 comprises a satellite platform 2 which contains the subsystems necessary for the control and management of a satellite. Said subsystems (not shown or further described because they are conventional) are redundant, i.e. they are duplicated to increase their reliability.

As schematically shown in FIG. 5, the satellite platform 2 further comprises a safety subsystem 21 comprising a command and control unit 3 powered by a source of electricity 4 (for example a battery or photovoltaic panels) preferably dedicated to the command and control module 3.

The command and control unit 3 comprises a signal transmitter 5 able to send signals on the Earth's surface and a signal receiver 6 able to receive signals from the Earth's surface.

The command and control unit 3 further comprises a timer 7 and a plurality of driving circuit boards 8 configured to generate and send driving signals SP to actuator members 15.

All the devices of the safety subsystem 21 are redundant, so as to increase the reliability of the subsystem.

The satellite platform 2 further comprises at least one conventional propulsion system 9 configured to move the orbital transport spacecraft 1 along an orbit or to move it to a different orbit. The propulsion system 9 is further configured to correct and/or change the attitude of the orbital transport spacecraft 1.

The transport spacecraft 1 further comprises a mechanical interface 10 whereby the orbital transport spacecraft 1 is connected to the space launcher 100.

The orbital transport spacecraft 1 comprises a plurality of release systems 20. Each release system 20 comprises a POD (Picosatellite Orbital Deployer) 11 inside which are housed one or more satellites 12. The PODs serve as releasing pipes, with the function of storing, transporting and releasing the satellites 12 that have to be placed in orbit and are preferably housed in a cargo area 12a of the orbital transport spacecraft 1.

The PODs 11 are modular and independent of each other. By way of example, the orbital transport spacecraft 1 can transport 48 Cubesats each of 1 unit (1 Cubesat unit is defined by a volume of 10×10×10 cm), or 16 Cubesats each of 3 units or else 8 Cubesats each of 6 units, or 4 Cubesats each of 12 units and mixed configurations thereof.

Figure 4:
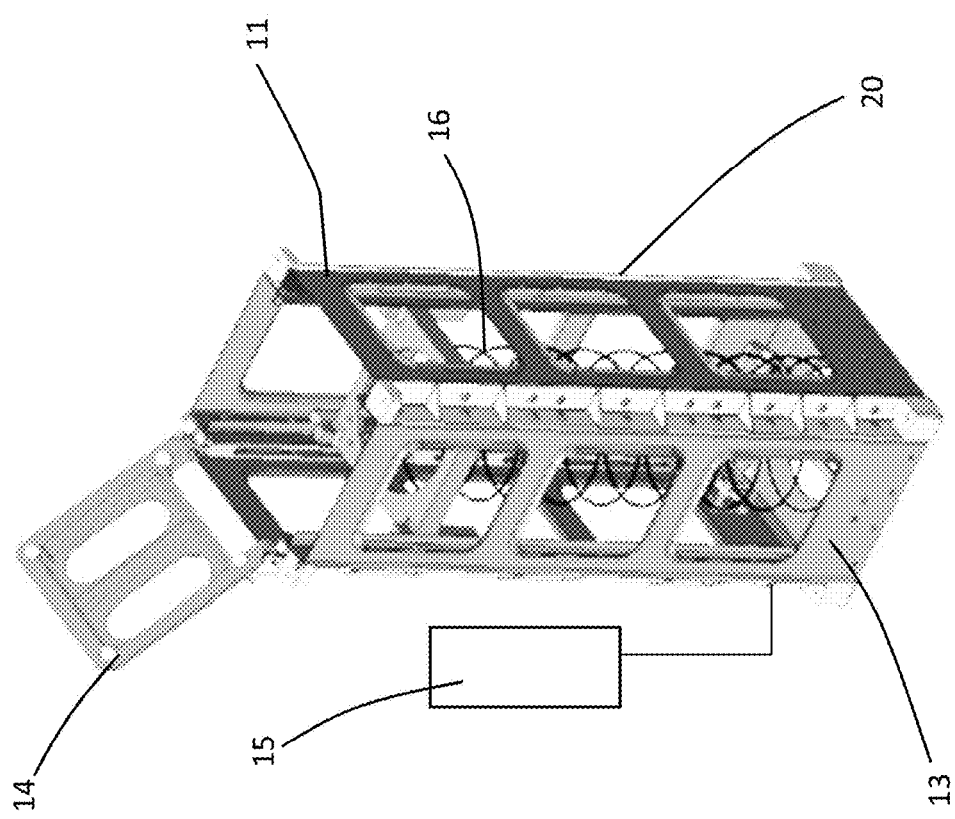

As shown in FIG. 4 (which shows a POD for the transport and release of a 3-unit Cubesat), each POD is provided with a containment casing 13, an opening door 14 and pusher members 16 to expel the Cubesats transported imparting a predetermined thrust to them.

Said pusher members 16 can for example be springs preloaded according to the thrust to be imparted to the Cubesat at the time of the release.

The actuator members 15 act on each POD 11 and in particular on the opening door 14 and on the pusher members 15, as schematically indicated in FIG. 4.

Figure 3:
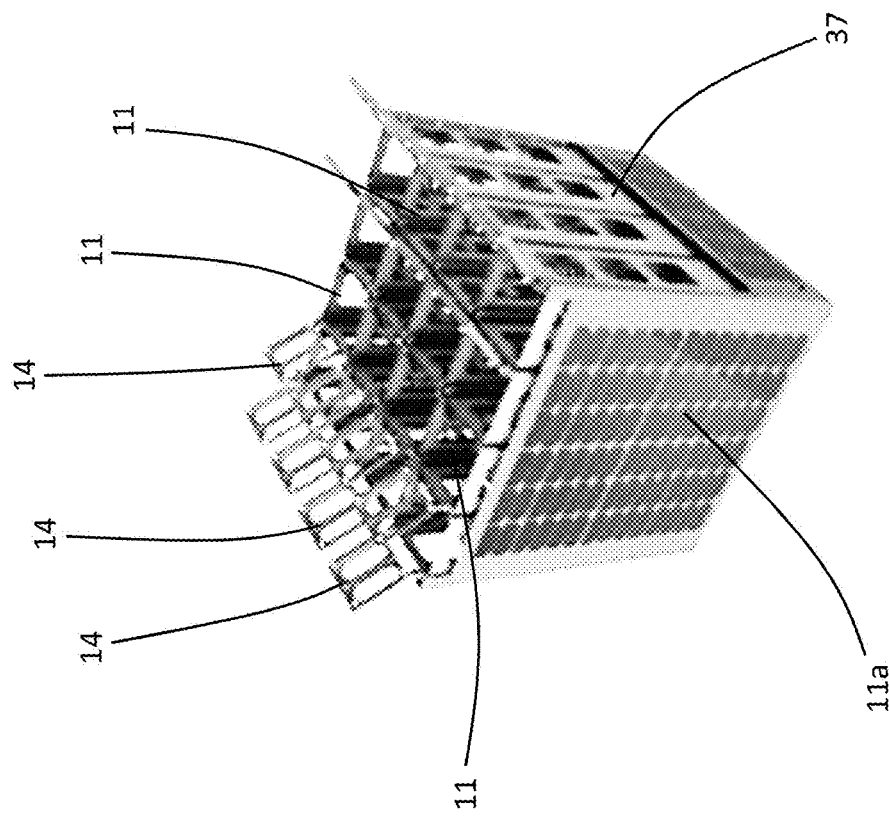
FIG. 3 shows a plurality of PODs 11 in which each POD is able to house a 3-unit Cubesat. The PODs 11 can be powered by photovoltaic panels 11a installed on the structure of the PODs themselves.
Figure 6:
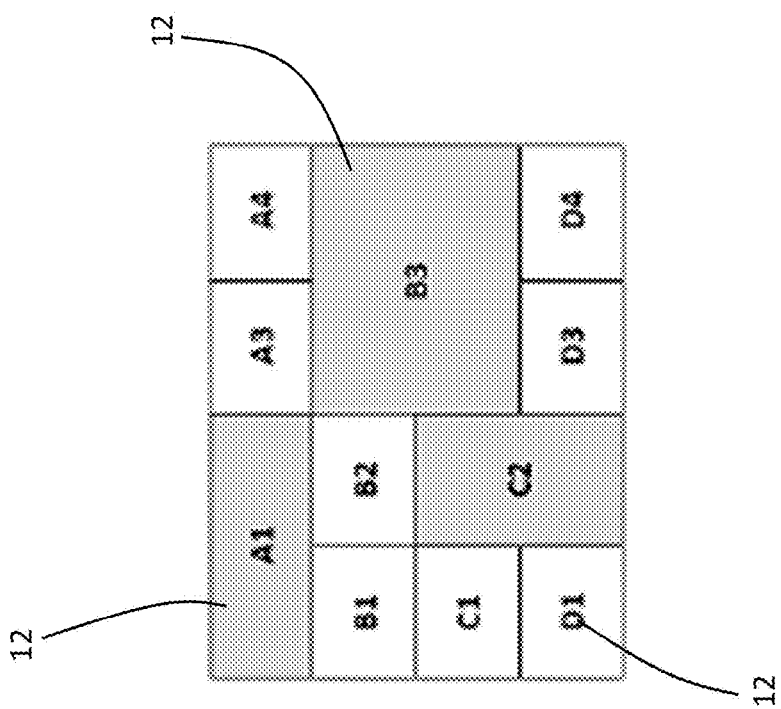
FIG. 6 shows an example of mixed configuration of Cubesats transported by the orbital transport spacecraft 1, in which A1 and C1 represent respective 6-unit Cubesats, A3, A4, B1, B2, C1, D1, D3, D4 represent respective rows of three Cubesats of 1 unit, B3 represents a 12-unit Cubesat.
Figure 5:
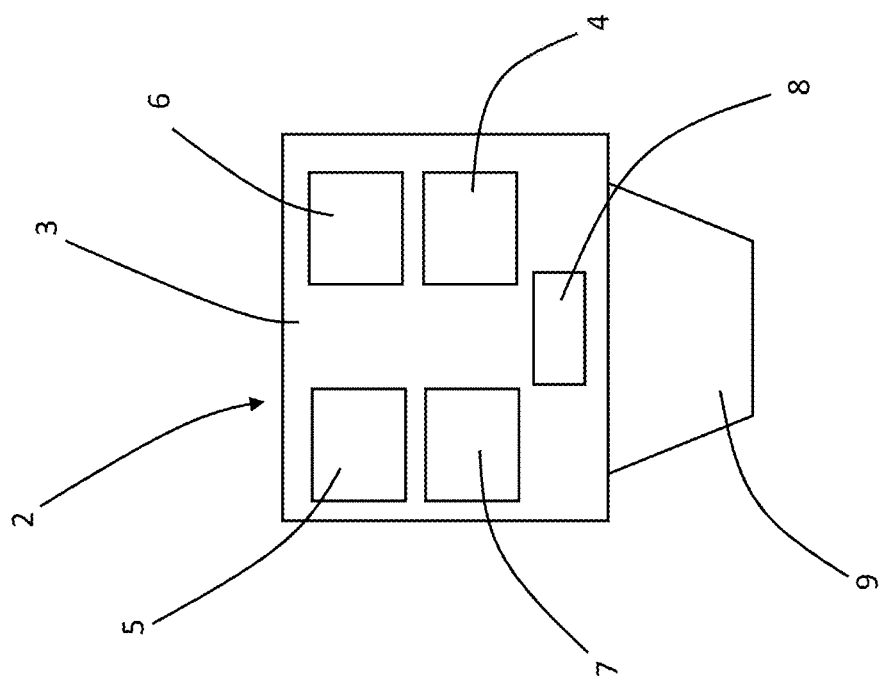

The PODs 11 are arranged mutually side by side to form a matrix of PODs in which, preferably, all opening doors 14 lie with the same orientation and are coplanar, as shown in FIG. 3.

The orbital transport spacecraft 1 is equipped with the satellites 12 inserted in the PODs 11 and then housed in the space launcher 100.

The space launcher 100 is placed in orbit around the Earth. The orbital height and the position reached by the space launcher 100 is for example the one specifically prescribed for the release of the main satellite 103 which represents the most important payload of the space launcher and for which the space mission was mainly conceived.

During a launch mission that encounters no problems, the orbital transport spacecraft 1 is released by the space launcher 100. The releasing step occurs imparting a separation thrust to the orbital transport spacecraft 1 able to remove the orbital transport spacecraft 1 from the space launcher 100. Said thrust gives the transport spacecraft 1 a momentum that, depending on current regulations and/or on the mission parameters, is able to move the orbital transport spacecraft 1 into the orbit reached for a time period of a few days (usually 2 or 3 days).

The orbital transport spacecraft 1 then releases according to a predetermined sequence the satellites 12 that are positioned in the selected orbits.

If the orbital transport spacecraft 1 is not released by the space launcher 100 for any reason (for example because a release actuator of the transport spacecraft 1 has a malfunction or because the subsystems of the satellite platform 2 of the orbital transport spacecraft 1 have a malfunction), the safety subsystem 21 of the orbital transport spacecraft 1 is activated to activate an activation sequence of the PODs 11.

The safety subsystem 21 of the transport spacecraft 1 also activates the activation sequence of the PODs 11 also if the transport spacecraft 1 is correctly released by the space launcher 100 but, subsequently, suffers a breakdown, for any reason, that compromises the ability to complete the mission for the release of the satellites 12.

The safety subsystem 21 is independent and separate from the other subsystems of the satellite platform 2, so that a failure in any subsystem of the satellite platform 2 does not compromise the operation of the safety subsystem 21.

The safety subsystem 21 generates an activation sequence of the PODs 11 to release the satellites 12 also if the orbital transport spacecraft 1 is still in the space launcher 100.

Figure 7:
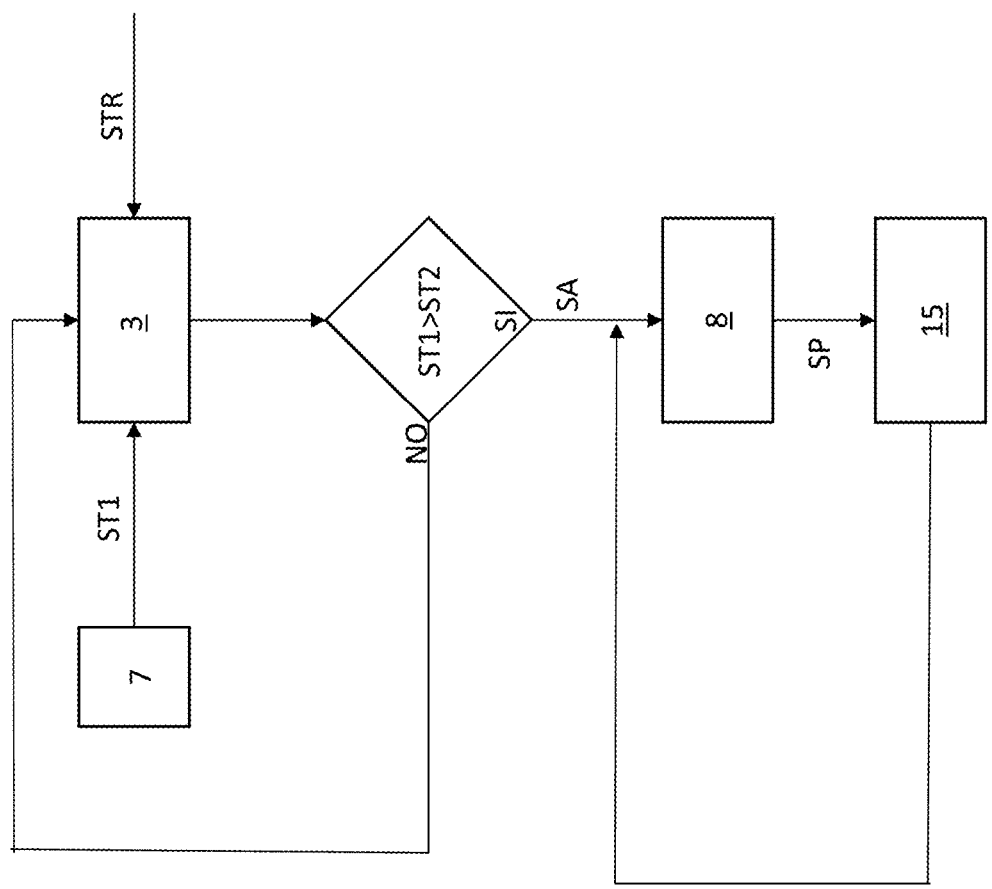

In particular, as is schematically shown in FIG. 7, the timer 7 generates a signal ST1 representative of a first time elapsed since the last communication between the orbital transport spacecraft 1 and a remote transmission station (for example on Earth). If the orbital transport spacecraft 1 was not released by the space launcher 100 (or suffered a breakdown after the release by the space launcher 100) and, consequently, it did not send any signal to the remote transmission station (for example because the subsystems of the satellite platform 2 are faulty), the missed signal is indicative of the impossibility of the orbital transport spacecraft 1 to complete the mission for the release of the satellites 12.

The command and control unit 3, powered by the source of electricity 4, compares the signal ST1 with a signal STR indicative of a reference maximum waiting time.

If the outcome of the control is such that ST1>STR, then the command and control unit 3 generates an activation signal SA and sends it to the driver boards 8 of the PODs 11.

If the outcome of the control is such that ST1<STR, then the control is carried out again after a predetermined period of time.

When the driving circuit boards 8 receive the activation signal SA, they generate the driving signal SP and send it to the actuator members 15 that release a predetermined satellite 12 from the corresponding POD 11.

In particular, upon receiving the driving signal SP, the actuator members 15 act on the release door 14 opening it and maintaining it in open condition and on the pusher members 15 which impart a release thrust to the satellite 12 moving it away from the orbital transport spacecraft 1. The release push, as well as the release direction, are calculated by the command and control unit 3 to direct the satellite 12 to the selected orbital position.

After a certain time, necessary for the satellite 12 to move away from the orbital transport spacecraft 1 and/or from the space launcher 100, elapses, the driving circuit boards 8 generate an additional driving signal SP and the release cycle of a new satellite 12 is repeated, as schematically shown in FIG. 7.

The cycle is iteratively repeated until all the satellites 12 are released.

In this way, even if the release of the orbital transport spacecraft 1 fails or if the orbital transport spacecraft 1 suffers a breakdown after release from the space launcher 100, all the satellites 12 would be positioned in orbit correctly.

Obviously, a person skilled in the art, to meet specific and contingent needs, may make numerous modifications and variants to the invention described above, without thereby departing from the scope of protection of the present invention as defined by the following claims.

The invention claimed is:

1. A method for the release of artificial satellites in Earth's orbit comprising the steps of:
providing an orbital transport spacecraft able to move at an orbital height and comprising a plurality of Picosatellite Orbital Deployers (PODs) for releasing satellites transported by the orbital transport spacecraft;
housing said orbital transport spacecraft in a space launcher configured to reach the orbital height;
generating a release signal and transmitting it to the orbital transport spacecraft to release the orbital transport spacecraft from the space launcher;
upon detecting a failure to release the orbital transport spacecraft or upon detecting a breakdown of the orbital transport spacecraft after releasing from the space launcher, activating a safety subsystem of the orbital transport spacecraft to generate a POD activation sequence to release the satellites.

2. The method according to claim 1, wherein said satellites are released according to a predetermined release pattern.

3. The method according to claim 1, wherein detecting the failure or detecting the breakdown comprises determining a first time representative of the time elapsed since the last communication occurred between the orbital transport spacecraft and a remote transmission station, comparing said first time with a reference time indicative of a maximum waiting time.

4. The method according to claim 1, wherein detecting a failure or detecting a breakdown comprises determining a first time representative of the time elapsed since the last communication occurred between the orbital transport spacecraft and a remote transmission station, comparing said first time with a reference time indicative of a maximum waiting time, and wherein activating the safety subsystem comprises activating actuator members for the release of a satellite when the first time is greater than the reference time.

5. The method according to claim 4, wherein activating actuator members comprises opening a release door of a POD, locking the release door in open position, exerting a separation thrust on the satellite to be released.

6. The method according to claim 5, wherein activating actuator members is followed by waiting a waiting time and activating actuator members of an additional POD to release a further satellite.

7. The method according to claim 5, wherein the separation thrust exerted on each satellite is calculated as a function of the orbit to be reached by the satellite.

8. The method according to claim 1, wherein said safety subsystem of said orbital transport spacecraft comprises a command and control unit on board said orbital transport spacecraft or on board each POD powered by an electric power source on board said transport spacecraft.

9. The method according to claim 8, wherein said activation sequence is implemented by said command and control unit.

10. The method according to claim 8, wherein said command and control unit is completely autonomous and independent from further subsystems of the orbital transport spacecraft.

11. The method according to claim 8, wherein said electric power source is a battery dedicated to the command and control unit or is a battery, shared with subsystems of a satellite platform of the orbital transport spacecraft or are photovoltaic panels.

* * * * *